United States Patent
Zhang et al.

(10) Patent No.: US 10,826,690 B2
(45) Date of Patent: Nov. 3, 2020

(54) TECHNOLOGIES FOR ESTABLISHING DEVICE LOCALITY

(71) Applicant: Intel Corporation, Santa Clara, CA (US)

(72) Inventors: Bo Zhang, Raleigh, NC (US); Siddhartha Chhabra, Portland, OR (US); William A. Stevens, Folsom, CA (US); Reshma Lal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 15/856,568

(22) Filed: Dec. 28, 2017

(65) Prior Publication Data

US 2019/0044710 A1 Feb. 7, 2019

(51) Int. Cl.
| | |
|---|---|
| *H04L 9/08* | (2006.01) |
| *H04L 9/32* | (2006.01) |
| *H04L 29/06* | (2006.01) |
| *H04L 9/06* | (2006.01) |
| *G06F 21/85* | (2013.01) |

(52) U.S. Cl.
CPC ............ *H04L 9/0825* (2013.01); *G06F 21/85* (2013.01); *H04L 9/0631* (2013.01); *H04L 9/0637* (2013.01); *H04L 9/0861* (2013.01); *H04L 9/3271* (2013.01); *H04L 63/04* (2013.01); *H04L 63/18* (2013.01); *G06F 2221/2107* (2013.01); *G06F 2221/2111* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,872,917 | A * | 2/1999 | Hellman | ................. | G06F 21/31 709/229 |
| 6,973,217 | B2 * | 12/2005 | Boliek | ................. | G11B 27/036 375/E7.051 |
| 6,988,250 | B1 * | 1/2006 | Proudler | ................. | G06F 21/34 705/50 |
| 8,230,486 | B2 * | 7/2012 | Voice | ..................... | G06F 21/34 726/5 |
| 8,391,489 | B2 * | 3/2013 | Paksoy | ................. | G06F 21/78 380/255 |
| 8,631,247 | B2 * | 1/2014 | O'Loughlin | ........... | G06F 21/57 713/187 |

(Continued)

OTHER PUBLICATIONS

Google search history for performing non-patent literature searches (obtained Oct. 3, 2019).*

(Continued)

*Primary Examiner* — Sharon S Lynch
(74) *Attorney, Agent, or Firm* — Barnes & Thornburg LLP

(57) ABSTRACT

Technologies for establishing device locality are disclosed. A processor in a computing device generates an identifier distinct to the computing device. The processor transmits the identifier to a management controller via a hardware bus in the computing device. The processor generates a key and encrypts the key with the identifier to generate a wrapped key. The processor transmits the wrapped key to the management controller. In turn, the management controller unwraps the key using the identifier. Other embodiments are described and claimed.

13 Claims, 5 Drawing Sheets

(56) References Cited

U.S. PATENT DOCUMENTS

| | | | |
|---|---|---|---|
| 8,850,543 B2* | 9/2014 | Von Bokern | H04L 63/102 726/7 |
| 9,071,446 B2* | 6/2015 | Kreft | G06F 21/71 |
| 9,294,478 B2* | 3/2016 | Von Bokern | H04L 63/102 |
| 9,563,758 B2* | 2/2017 | Lehmann | G06F 21/31 |
| 10,108,789 B2* | 10/2018 | Lehmann | G06F 21/31 |
| 2004/0120585 A1* | 6/2004 | Schwartz | G11B 27/036 382/233 |
| 2005/0144449 A1* | 6/2005 | Voice | G06F 21/34 713/169 |
| 2006/0095970 A1* | 5/2006 | Rajagopal | G06F 21/577 726/25 |
| 2006/0129848 A1* | 6/2006 | Paksoy | G06F 21/78 713/193 |
| 2007/0053513 A1* | 3/2007 | Hoffberg | G06K 9/00369 380/201 |
| 2008/0019517 A1* | 1/2008 | Munguia | G06F 21/6209 380/210 |
| 2009/0259838 A1* | 10/2009 | Lin | H04L 9/3226 713/150 |
| 2010/0115625 A1* | 5/2010 | Proudler | G06F 21/445 726/27 |
| 2011/0161650 A1* | 6/2011 | Paksoy | G06F 21/78 713/2 |
| 2011/0162082 A1* | 6/2011 | Paksoy | G06F 21/78 726/26 |
| 2012/0144457 A1* | 6/2012 | Counterman | H04L 9/3247 726/5 |
| 2013/0061056 A1* | 3/2013 | Proudler | G06F 21/57 713/176 |
| 2014/0108786 A1* | 4/2014 | Kreft | G06F 21/71 713/156 |
| 2014/0189118 A1* | 7/2014 | Hunter | H04L 65/40 709/225 |
| 2014/0189355 A1* | 7/2014 | Hunter | H04L 63/0428 713/171 |
| 2015/0143514 A1* | 5/2015 | Paksoy | G06F 21/78 726/20 |
| 2017/0075699 A1* | 3/2017 | Narayanan | G06F 9/4416 |
| 2017/0187695 A1* | 6/2017 | Narayanan | G06F 9/4416 |
| 2017/0201373 A1* | 7/2017 | Vijayakumar | H04L 9/0822 |
| 2019/0116040 A1* | 4/2019 | Ozzie | G06K 19/06028 |

OTHER PUBLICATIONS

Search Query Report from IP.com (performed Mar. 11, 2020).*
Search Query Report from IP.com (performed Jun. 25, 2020).*

* cited by examiner

TECHNOLOGIES FOR ESTABLISHING DEVICE LOCALITY

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data for a given computing device while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

SGX may further be used to protect a platform services enclave (PSE). The PSE may provide security-related services to the platform, such as monotonic counters, trusted time services, and remote attestation services. Further, the PSE may establish secure communication sessions with other hardware components in a computing device, including management controllers (e.g., a converged security and manageability engine (CSME)) having modules configured to perform cryptographic functions external to an operation system of the computing device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
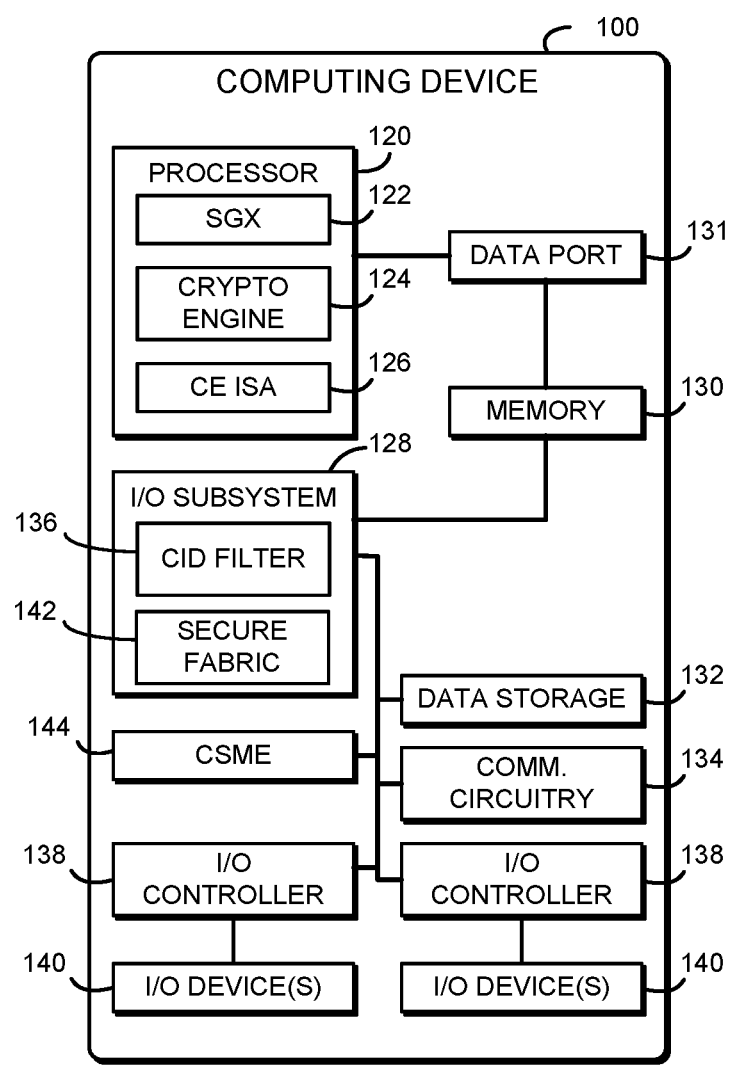
FIG. 1 is a simplified block diagram of at least one embodiment of a computing device for establishing device locality therein.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for establishing device locality is shown. In use, as further described herein, the computing device 100 provides a processor 120 that generates a locality domain identifier (LDID) distinct to the computing device 100 that is shared with other components on a hardware platform of the computing device 100. The LDID is transmitted via local channels, such as a hardware bus of the computing device 100, to ensure that only local hardware components have possession of the LDID. As a result, the processor (or other hardware components in the computing device 100) may use the LDID as proof of locality to other local components on the computing device 100. For example, the processor 120 may securely provision a management controller (e.g., a CSME 144) with the LDID, and perform a challenge-response handshake using the LDID to subsequently establish a secure communication session between the processor 120 and the CSME 144. Advantageously, using a local identifier to establish that hardware components are on the same system ensures that secure communication sessions are established within the same physical device and not with a remote system. Thus, embodiments presented herein provide an approach for preventing malicious attacks, such as remote pairing attacks, on the computing device 100.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a memory 130, a data port 131, a data storage device 132, a CID filter 136, one or more I/O controllers 138, and a security management controller (e.g., a converged security and manageability engine (CSME)) 144. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and a cryptographic engine instruction set architecture (ISA) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. Further, the secure enclave support 122 may create a platform services enclave (PSE), which is a trusted execution environment that provides access to services provided by the CSME 144, including monotonic counters, trusted time services, remote attestation services, and others. The PSE may communicate with other hardware components (e.g., the I/O subsystem 128, the CSME 144, other processors 120, etc.) and secure enclaves in the computing device 100 via one or more secure communication sessions. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, as described further below, the cryptographic engine 124 may perform TIO functions such as encrypting and/or decrypting DMA I/O data input from and/or output to one or more I/O devices 140. In particular, in some embodiments, plaintext I/O data may be stored in a TIO Processor Reserved Memory (TIO PRM) region that is not accessible to software of the computing device 100, and the cryptographic engine 124 may be used to encrypt the plaintext DMA I/O data and copy the encrypted data to an ordinary kernel I/O buffer. The processor 120 may also include one or more range registers or other features to protect the TIO PRM from unauthorized access.

The cryptographic engine ISA 126 may be embodied as one or more processor instructions, model-specific registers, or other processor features that allows software executed by the processor 120 to securely program and otherwise use the cryptographic engine 124 and a corresponding CID filter 136, described further below. For example, the cryptographic engine ISA 126 may include processor features to bind programming instructions to the cryptographic engine 124 and/or the CID filter 136, unwrap bound programming instructions, securely clean the TIO PRM region of the memory 130, and/or securely copy and encrypt data from the TIO PRM region to a kernel I/O buffer. Additionally or alternatively, although illustrated as including trusted I/O capabilities, in some embodiments the computing device 100 may not include one or more components related to trusted I/O. For example, in some embodiments, the computing device 100 may not include the CID filter 136, the cryptographic engine 124, and/or the cryptographic engine ISA 126.

The CSME 144 may be embodied as a hardware platform controller that includes logic to perform operations relating to security on the computing device 100 and management of access to hardware resources. For instance, the CSME 144 performs various cryptographic functions (e.g., encryption and decryption of data) for the computing device 100 that are external from the processor 120 and operating system of the computing device 100. The CSME 144 may also provide security-related services such as monotonic counters, trusted time services, and other services.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. Further, the memory 130 may also include the TIO PRM region. Further, the memory 130 may be connected with one or more data ports 131 to send and receive data from the processor 120 and the I/O subsystem 128. In other embodiments, the memory 130 is communicatively coupled to the processor 120 via the I/O subsystem 128. The I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. The I/O subsystem 128 may further include a secure fabric 142. The secure fabric 142 provides secure routing support, which may include hardware support to ensure I/O data cannot be misrouted in the I/O subsystem 128 under the influence of rogue software. The secure fabric 142 may be used with the CID filter 136 to provide cryptographic protection of I/O data. Additionally, in some embodiments, the I/O subsystem 128 may form a portion of a system-on-a-chip (SoC) and be incorporated, along with the processor 120, the memory 130, and other components of the computing device 100, on a single integrated circuit chip.

Additionally or alternatively, in some embodiments the processor 120 may include an integrated memory controller and a system agent, which may be embodied as a logic block in which data traffic from processor cores and I/O devices converges before being sent to the memory 130.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The CID filter 136 may be embodied as any hardware component, functional block, logic, or other circuit that performs CID filtering function(s), including filtering I/O transactions based on CIDs inserted by the I/O controllers 138. For example, the CID filter 136 may observe DMA transactions inline, perform test(s) based on the CID and memory address included in the transaction, and drop transactions that fail the test(s). In the illustrative embodiment, the CID filter 136 is incorporated in the I/O subsystem 128. In other embodiments, the CID filter 136 may be included in one or more other components and/or in an SoC with the processor 120 and I/O subsystem 128 as separate components.

Each of the I/O controllers 138 may be embodied as any embedded controller, microcontroller, microprocessor, functional block, logic, or other circuit or collection of circuits capable of performing the functions described herein. In some embodiments, one or more of the I/O controllers 138 may be embedded in another component of the computing device 100 such as the I/O subsystem 128 and/or the processor 120. Additionally or alternatively, one or more of the I/O controllers 138 may be connected to the I/O subsystem 128 and/or the processor 120 via an expansion bus such as PCI Express (PCIe) or other I/O connection. As described above, the I/O controllers 138 communicate with one or more I/O devices 140, for example over a peripheral communications bus (e.g., USB, Bluetooth, etc.). The I/O devices 140 may be embodied as any I/O device, such as human interface devices, keyboards, mice, touch screens, microphones, cameras, and other input devices, as well as displays and other output devices. As described above, the I/O controllers 138 and associated DMA channels are uniquely identified using identifiers called channel identifiers (CIDs). Each I/O controller 138 may assert an appropriate CID with every DMA transaction, for example as part of a transaction layer packet (TLP) prefix, to uniquely identify the source of the DMA transaction and provide liveness protections. The CID also enables the isolation of I/O from different devices 140.

Figure 2:
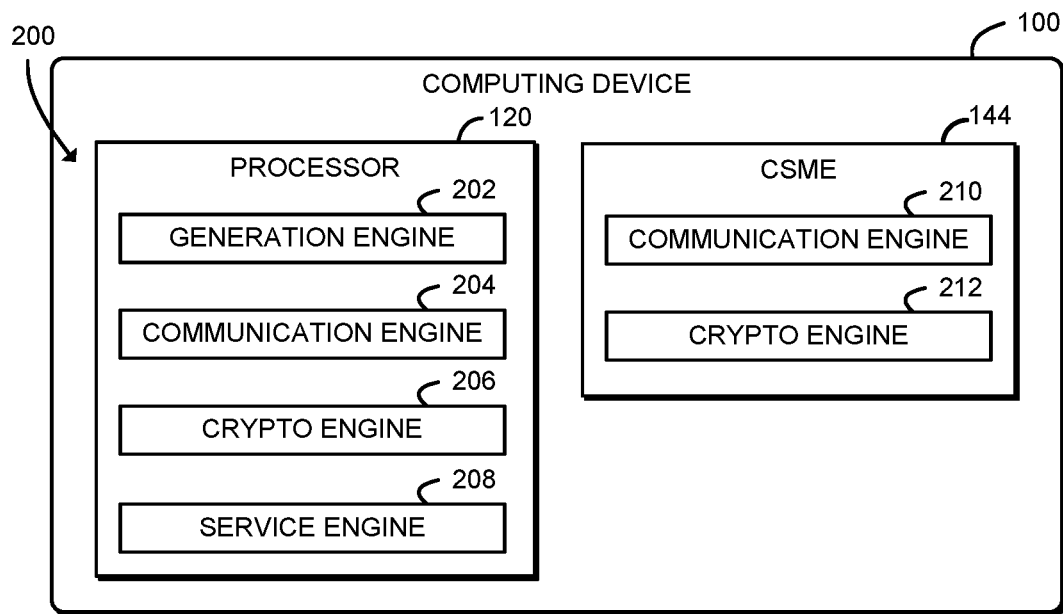
FIG. 2 is a simplified block diagram of at least one embodiment of an environment of the computing device of FIG. 1.

Referring now to FIG. 2, in an illustrative embodiment, the computing device 100 establishes an environment 200 during operation. Illustratively, the environment 200 provides a generation engine 202, a communication engine 204, a crypto engine 206, a service engine 208, a communication engine 210, and a crypto engine 212. The various components of the environment 200 may be embodied as hardware, firmware, software, or a combination thereof. As such, in some embodiments, one or more of the components of the environment 200 may be embodied as circuitry or collection of electrical devices (e.g., generation engine circuitry 202, communication engine 204 circuitry 204, crypto engine circuitry 206, service engine circuitry 208, communication engine circuitry 210, and/or crypto engine circuitry 212). It should be appreciated that, in such embodiments, one or more of the generation engine 202, communication engine 204, crypto engine 206, service engine 208, communication engine 210, and/or crypto engine 212 may form a portion of the processor 120, the I/O subsystem 128, the CSME 144, and/or other components of the computing device 100. In particular, as shown in FIG. 2, the generation engine 202, communication engine 204, crypto engine 206, and service engine 208 may be embodied as digital logic, microcode, or other resources of the processor 120. Further, as shown in FIG. 2, the communication engine 210 and crypto engine 212 may be embodied as digital logic, microcode, or other resources of the CSME 144. Additionally, in some embodiments, one or more of the illustrative components may form a portion of another component and/or one or more of the illustrative components may be independent of one another.

The generation engine 202 is configured to create a locality identifier (LDID) that is distinct to the computing device 100. For example, the generation engine 202 may compute the LDID from a variety of characteristics, such as a serial number of the processor 120, a randomly generated number, and a timestamp of when the LDID was produced.

The communication engine 204 is configured to transmit data to and receive data from other components in the hardware platform of the computing device 100. The communication engine 204 may transmit the data over a hardware bus (e.g., a Peripheral Component Interconnect Express (PCIe) bus, a Direct Media Interface (DMI) bus, etc.). Further, the communication engine 204 may transmit data over a sideband network of the hardware platform. The sideband network electrically connects the processor 120 with other hardware components in the computing device 100. In one embodiment, the communication engine 204 may transmit the LDID to other hardware components in the computing device 100, such as the CSME 144. In addition, the communication engine 204 may receive requests to establish a secure communication session with the hardware components, such as the CSME 144. The communication engine 204 may transmit additional data to components on the hardware platform (e.g., challenge-response messages, cryptographic keys, and the like) to establish the secure communication session.

The crypto engine 206 is configured to perform various cryptographic algorithms to encrypt or decrypt data. For example, the crypto engine 206 may perform Advanced Encryption Standard (AES), Galois/Counter Mode (GCM), AES-GCM, and the like. The crypto engine 206 is configured to wrap a locality proof key using the LDID. The wrapped locality proof key may be used to establish that a hardware component (e.g., the CSME 144) is in possession of the LDID. More specifically, the crypto engine 206 may wrap the locality proof key, such that a hardware component must use the LDID to recover the locality proof key.

The service engine 208 is configured to generate the locality proof key (LPK). The locality proof key may be used to establish that a hardware component (e.g., the CSME 144) is in possession of the LDID. More specifically, as described above, the crypto engine 206 may wrap the locality proof key using the LDID, such that a hardware component must use the LDID to recover the locality proof key. The service engine 208 is also configured to generate challenge-response messages, e.g., for use in authenticating the processor 120 and another device in establishing a secure session. The service engine 208 may be configured to load a platform services enclave (PSE) to perform those operations.

The communication engine 210 is configured to transmit data to and receive data from other components in the hardware platform of the computing device 100, such as the processor 120. The communication engine 210 may transmit the data over a hardware bus (e.g., a Peripheral Component Interconnect Express (PCIe) bus, a Direct Media Interface (DMI) bus, etc.). Further, the communication engine 210 may transmit data over a sideband network of the hardware platform. The sideband network electrically connects the CSME 144 with other hardware components in the computing device 100. In one embodiment, the communication engine 210 may receive the LDID from the processor 120. Further, the communication engine 210 may also receive a wrapped locality proof key from the processor 120.

The crypto engine 212 is configured to perform various cryptographic algorithms to encrypt or decrypt data. For example, the crypto engine 206 may perform AES-GCM and other types of algorithms. In context of the present disclosure, the crypto engine 206 may encrypt messages (e.g., challenge-response messages) using an encryption key. The crypto engine 212 is also configured to unwrap data using decryption methods. For example, the crypto engine 212 may decrypt messages (e.g., challenge-response messages, messages containing identifier information) using an encryption key. More particularly, the crypto engine 212 may use the LDID as part of a decryption algorithm to recover a wrapped locality proof key obtained from the processor 120 via the communication engine 210.

Figure 3:
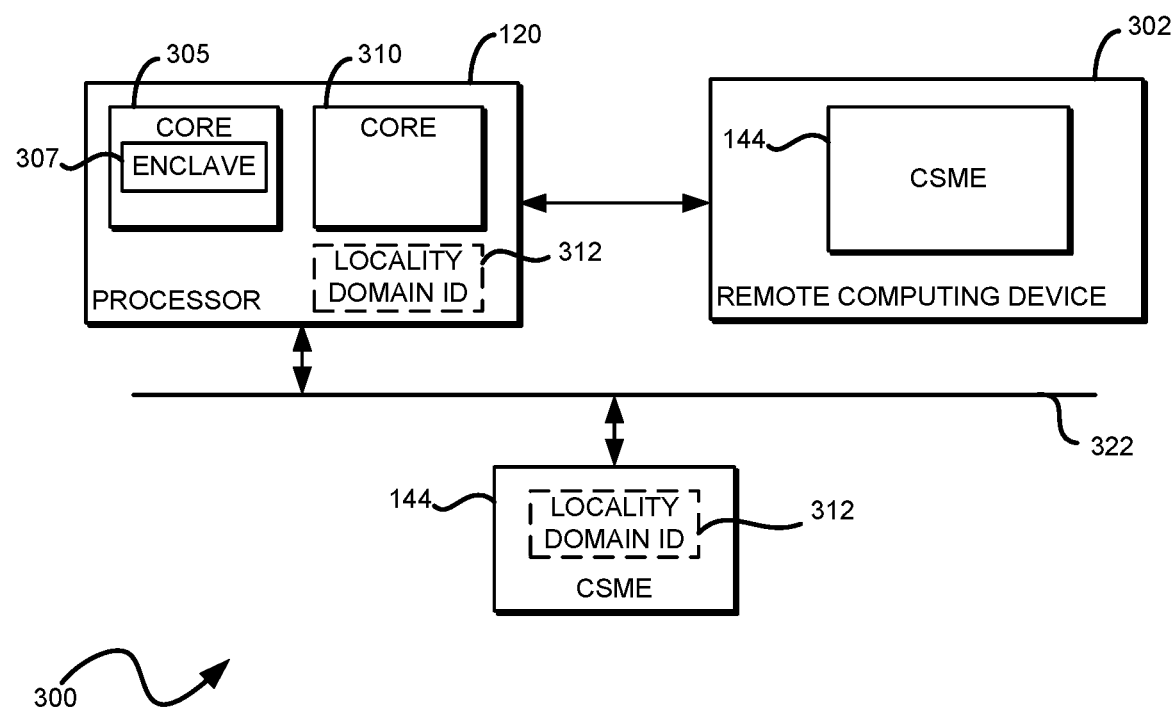
FIG. 3 is a simplified block diagram of an example embodiment of providing a locality domain identifier between a processor and a converged security and manageability engine (CSME)

Referring now to FIG. 3, diagram 300 illustrates an example of providing a locality domain identifier (LDID) between the processor 120 and the CSME 144. The diagram 300 depicts the processor 120 and the CSME 144 as being interconnected with a hardware bus 322 (e.g., a PCIe hardware bus, Direct Media Interface (DMI) hardware bus, host embedded controller interface (HECI) bus, sideband network, secure fabric 142, etc.). As shown, the processor 120 includes cores 305, 310, which are representative of processing units that read and execute program instructions. Illustratively, the core 305 establishes a platform services enclave (PSE) 307. The PSE 307 may communicate with the CSME 144 via the hardware bus 322.

Although secure communication sessions ensure that communications between hardware components locally residing in the computing device 100 remain secure, having a secure communication channel between the components may not guarantee that a given processor 120 and the CSME 144 reside on the same physical platform. Thus, without any safeguards in place, an adversary may potentially attack the computing device 100 from a remote system. For example, an adversary may attempt to establish a secure communication session between a CSME 144 of a remote computing device 302 and components in the computing device 100, such as the PSE 307 (as depicted with the double-arrowed line between the processor 120 and the remote computing device 302). If established, the remote CSME 144 could compromise various hardware components and secure enclaves in the computing device 100. For example, the remote CSME 144 may be compromised to generate monotonic counter values to replay encrypted messages protected using monotonic counter values from the PSE 307.

Embodiments presented herein disclose techniques for establishing locality of hardware components in the computing device 100. In one embodiment, the processor 120 generates a LDID 312. The LDID 312 corresponds to an identifier that is generated per-boot of the computing device 100. Further, the LDID 312 is a value that is unique to the computing device 100. For example, the processor 120 may generate the LDID 312 as a function of the PSE 307, a timestamp of when the LDID 312 was produced, and/or a randomly generated number. Further still, the processor 120 may store the LDID 312 in an area accessible to the processor 120, such as a reserved area of memory for the processor 120, a special register in the processor 120, etc.

Further, as further described herein, the processor 120 may share the LDID 312 with other hardware components residing in the computing device 100, such as the CSME 144. Doing so allows the PSE 307 to establish locality with the other hardware components. To ensure that hardware components that do not share the same hardware platform as the PSE 307 do not have access to the LDID 312, the processor 120 may transmit the LDID to the CSME 144 and other processors in the computing device 100 via the hardware bus 322. In practice, the processor 120 may do so during boot of the hardware platform.

Further still, the processor 120 may generate a locality proof key (LPK). The LPK is a randomly generated cryptography key that the PSE 307 uses to determine the locality of a given hardware component. For instance, the PSE 307 does so when establishing a secure communication session with the CSME 144. Once generated, the processor 120 wraps the LPK using the LDID. For example, the processor 120 may invoke an EBIND instruction to wrap the LPK. The processor 120 may then send the wrapped LPK to the CSME 144. The LPK allows the processor 120 to establish locality with the CSME 144 during initiation of a secure session with the CSME 144. Doing so allows the processor 120 to determine that the CSME 144 is in possession of the LDID transmitted to the CSME 144 at boot time.

Figure 4:
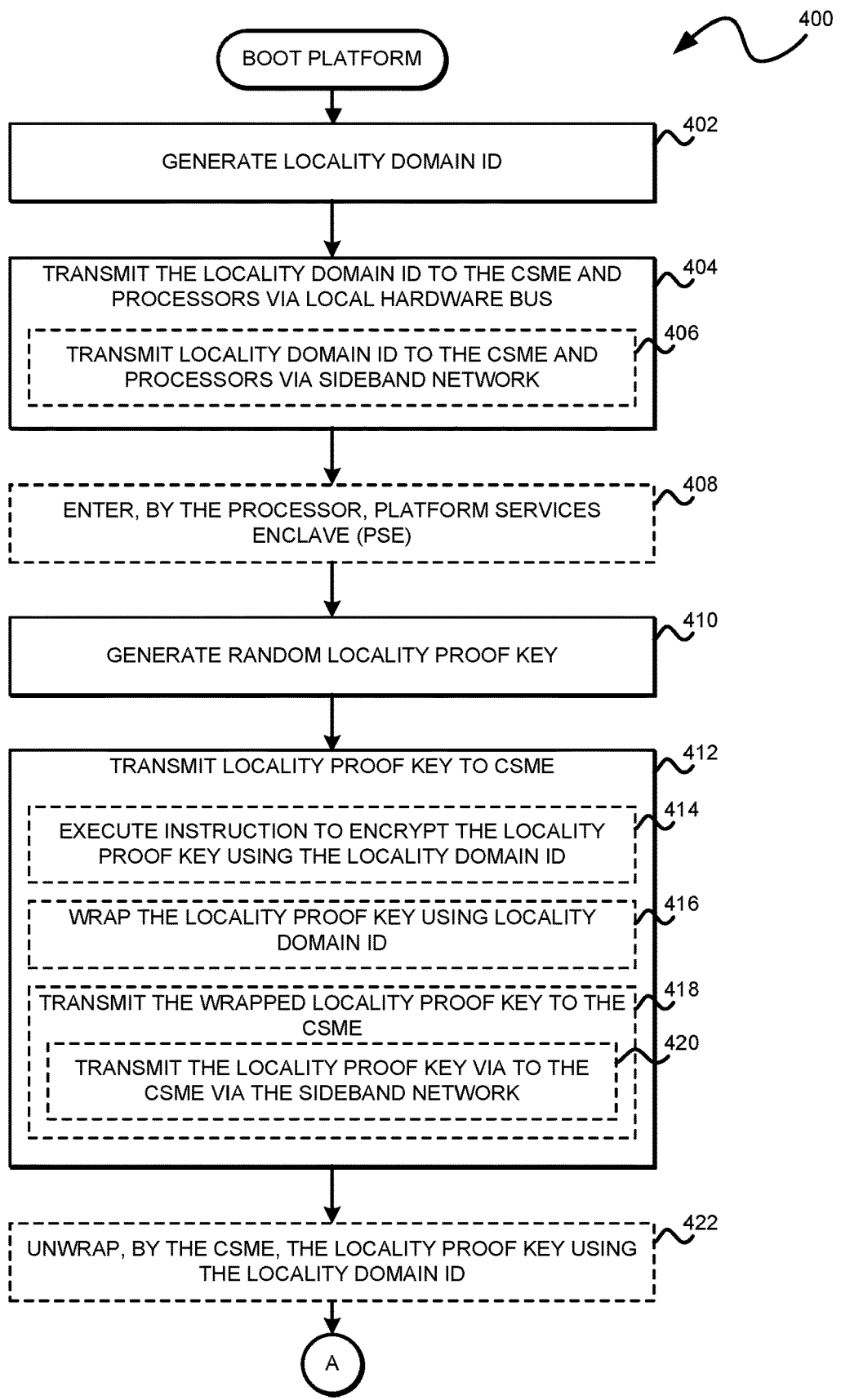
FIG. 4 is a simplified flow diagram of at least one embodiment of a method for exchanging a locality domain identifier between a processor and a CSME.

Referring now to FIG. 4, on boot of the hardware platform, the computing device 100 may execute a method 400 for establishing device locality. In some embodiments, the operations of the method 400 may be performed by one or more components of the environment 200 of the computing device 100. As shown, the method 400 begins in block 402, in which the processor 120 generates a LDID. For example, the processor 120 may generate a numeric value representative of the LDID from various attributes, e.g., a serial number of the processor 120, a timestamp indicative of when the processor 120 initiated generation of the LDID, a nonce, etc. Once generated, the processor 120 may store the LDID, e.g., in a register of the processor 120, processor reserved memory, etc.

In block 404, the processor 120 transmits the LDID to the CSME (and/or other processors in the computing device 100) via a local hardware bus, e.g., bus 322. Doing so via the local hardware bus ensures that the hardware components receiving the LDID are located on the hardware platform of the computing device 100 and not located on a remote device. In some embodiments, in block 406, the processor 120 transmits the LDID to the CSME (and other processors) via a local sideband network of the hardware platform. The sideband network electrically connects the processor 120 with other hardware components in the computing device 100. The processor 120, via the sideband network, may transmit signals indicative of the LDID to the CSME 144. Data transmitted over the sideband network is not routable to remote devices.

In block 408, the processor 120 may enter the PSE. For example, the processor 120 may execute an enter instruction to do so. The PSE is an isolated, trusted execution environment, protected from unauthorized access by the secure enclave support 122 of the processor 120. In turn, in block 410, the processor 120 generates a random LPK to distribute to the CSME 144. The processor 120 may use a variety of key generation techniques to do so, e.g., AES (Advanced Encryption Standard), Galois/Counter Mode (GCM), etc.

In block 412, the processor 120 transmits the locality proof key to the CSME 144. In block 414, the processor 120 executes an instruction to encrypt the LPK using the LDID. Doing so ensures that recipients not in possession of the LDID cannot obtain the LPK. In block 416, the processor 120 wraps the LPK using the LDID. In particular, the platform services enclave may invoke an EBIND instruction with a BIND_STRUCT object, causing the processor 120 to wrap the BIND_STRUCT object. A BIND_STRUCT is a data structure that is partially populated by software and partially populated by hardware. One potential embodiment of BIND_STRUCT is described in Table 1:

TABLE 1

BIND_STRUCT

| Name of Offset | Offset (Bytes) | Size (Bytes) | Description |
|---|---|---|---|
| VERSION | 0 | 4 | BIND_STRUCT version, must be 1 for first instantiation |
| RSVD | 4 | 12 | Reserved, must be zero |
| MAC | 16 | 16 | MAC on BTENCDATA, BTDATA, BTID, BTSVN, NONCE, SEQID |
| BTID | 32 | 4 | Target device |
| BTSVN | 36 | 4 | Target Security version number |
| NONCE | 40 | 8 | Nonce for Authenticated Responses |
| SEQID | 48 | 8 | Seed for generating Initialization Vector (IV) |
| RSVD | 56 | 8 | Reserved, must be zero |
| BTDATA | 64 | 128 | Target specific data |
| BTENCDATA | 192 | 48 | Target specific encrypted data, must be a multiple of 16 |
| BTUPDATA | 240 | 16 | Target specific data that is not encrypted nor integrity protected |

The BIND_STRUCT object created by the processor 120 may include a BTID field with a value that is indicative of the CSME, e.g., BTID=0x1 (LDID_HOLDER). Further, the PSE sets the BTENCDATA field to the generated LPK. The processor 120 then performs an algorithm to encrypt the BIND_STRUCT object. For example, the processor 120 may perform an AES-GCM algorithm to wrap the BIND_STRUCT object. The processor 120 writes the encrypted LPK to the BIND_STRUCT object. In block 418, the processor 120 transmits the wrapped LPK to the CSME 144. To do so, the processor 120 may send the wrapped BIND_STRUCT object containing the LPK via the local hardware bus. As another example, in block 420, the processor 120 transmits the BIND_STRUCT object to the CSME 144 via the sideband network. The wrapped BIND_STRUCT object may be delivered to the CSME 144 using any appropriate technique. For example, the wrapped BIND_STRUCT object may be delivered in response to the processor 120 executing an UNWRAP instruction.

The CSME 144 receives the wrapped LPK from the processor 120. More particularly, the CSME 144 receives the BIND_STRUCT object having the encrypted LPK from the processor 120. In block 422, the CSME 144 unwraps the BIND_STRUCT object using the LDID. For example, the CSME 144 may decrypt the wrapped LPK, use the LDID as the decryption key. Once unwrapped, the CSME 144 may store the LPK in a reserved area of memory, such as a volatile or non-volatile memory and/or memory range dedicated to the CSME 144.

Figure 5:
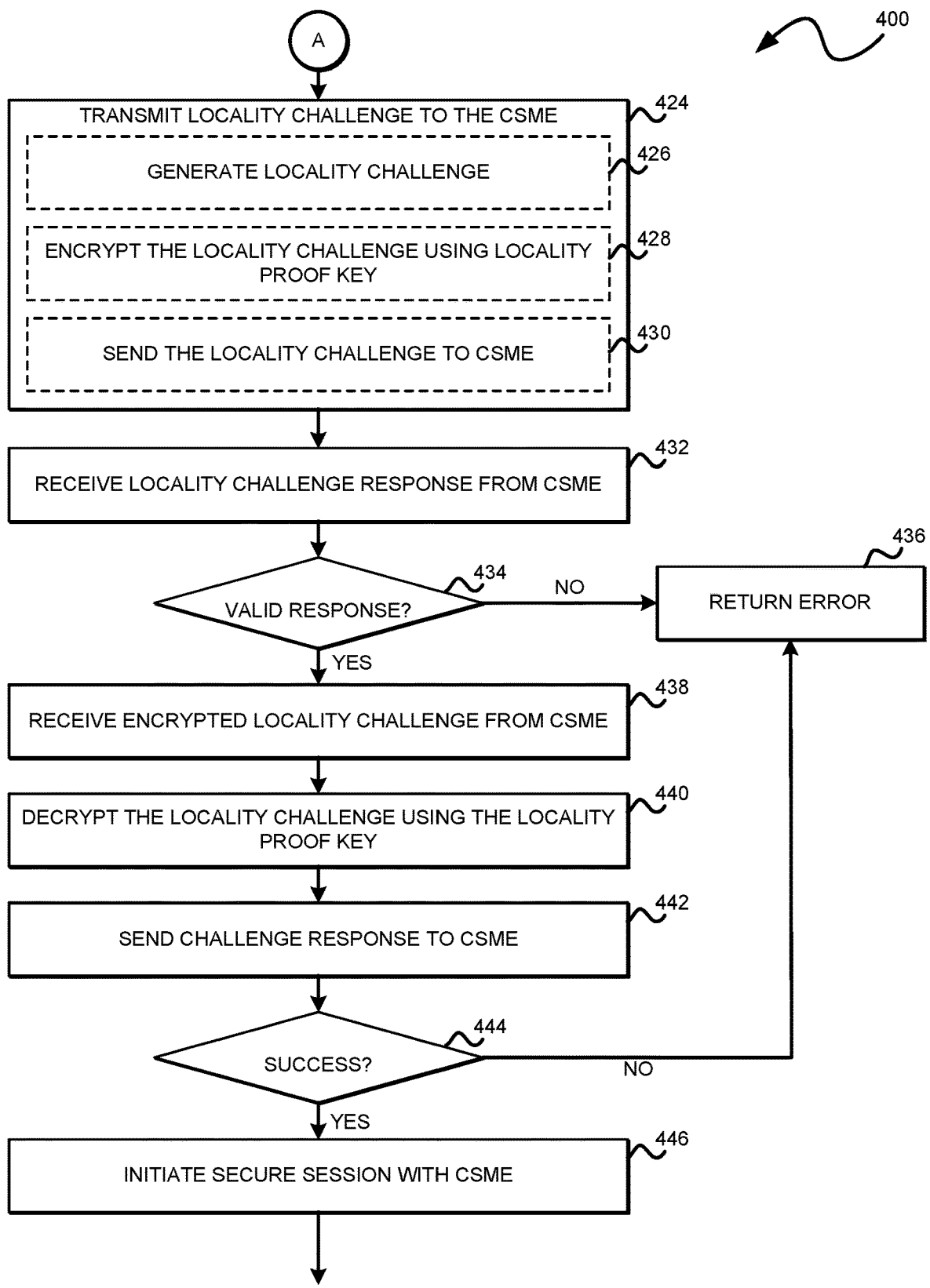
FIG. 5 is a simplified flow diagram of at least one embodiment of a method for performing challenges between a processor and a CSME to establish device locality.

As stated, the processor 120 may establish a secure communication session with the CSME 144 (or other components in the hardware platform of the computing device 100. For example, the CSME 144 may send a request to the processor 120 to establish a secure communication session, and the processor 120 receives the request. To ensure that the CSME 144 resides on the same platform as the processor 120, the processor 120 may issue a locality challenge to the CSME 144 (and vice versa) prior to establishing (or during establishment of) the secure communication session. Referring now to FIG. 5, in block 424, the processor 120 transmits a locality challenge to the CSME 144 corresponding to $Proof_{Enclave}=PRF_{LPK}(Challenge_{CSME})$. In particular, in block 426, the processor 120 may generate the locality challenge. The locality challenge may be a message, such as a randomly generated sequence or number. In block 428, the processor 120 signs the locality challenge using the LPK. The processor 120 may retrieve the LPK from storage and use the LPK as part of an encryption algorithm on the locality challenge. In block 430, the processor 120 transmits the encrypted locality challenge to the CSME 144. For example, the processor 120 may do so via the local hardware bus or the sideband network of the computing device 100.

The CSME 144 receives the wrapped locality challenge from the processor 120. The CSME 144 may invoke a cryptographic algorithm on the wrapped locality challenge to decrypt the locality challenge. The CSME 144 may generate a response to the locality challenge that matches an expected response for the locality challenge. Further, the CSME 144 may wrap the response using the LPK and send the response to the processor 120.

In block 432, the processor 120 receives the locality challenge response from the CSME 144. In block 434, the processor 120 validates the response to ensure a match to the expected response. If invalid, the processor 120 may return an error to the CSME 144 in block 436, after which the method 400 ends. Otherwise, if the response is valid, then the processor 120 may process a locality challenge from the CSME 144. Particularly, the CSME 144 generates a locality challenge and signs the locality challenge using the LPK (e.g., using similar techniques as described above). The CSME 144 sends the encrypted locality challenge to the processor 120. In block 438, the processor 120 receives the locality challenge from the CSME 144.

In block 440, the processor 120 decrypts the locality challenge using the LPK. The processor 120 may then generate a locality challenge response. In block 442, the processor 120 sends the locality challenge response to the CSME 144, which, in turn, validates the response and sends an acknowledgement to the CSME 144. In block 444, the processor 120 determines whether the acknowledgement is indicative that the response was successful. If not (e.g., if the CSME 144 returns an error to the processor 120), then the method 400 advances to block 436, in which the processor 120 returns an error. Otherwise, in block 446, the processor 120 establishes a secure communication session with the CSME 144. After establishing the secure communication session, the processor 120 has ensured that the CSME 144 is located in the same physical computing device 100, and thus the processor 120 may communicate securely with the CSME 144.

It should be appreciated that, in some embodiments, the method 400 may be embodied as various instructions stored on a computer-readable media, which may be executed by the processor 120, the I/O subsystem 128, the CSME 144 and/or other components of the computing device 100 to cause the computing device 100 to perform the method 400. The computer-readable media may be embodied as any type of media capable of being read by the computing device 100 including, but not limited to, the memory 130, the data storage device 132, firmware devices, other memory or data storage devices of the computing device 100, portable media readable by a peripheral device 140 of the computing device 100, and/or other media.

EXAMPLES

Illustrative examples of the technologies disclosed herein are provided below. An embodiment of the technologies may include any one or more, and any combination of, the examples described below.

Example 1 includes a computing device for establishing device locality, the computing device comprising: a processor comprising: a generation engine to generate an identifier, wherein the identifier is distinct to the computing device, a communication engine to transmit the identifier to a management controller via a hardware bus in the computing device, a service engine to generate the key, and a crypto engine to encrypt the key with the identifier to generate a wrapped key in response to generation of the key, wherein the service engine is further to transmit the wrapped key to the management controller.

Example 2 includes the subject matter of Example 1, and wherein the management controller comprises a crypto engine to: decrypt the wrapped key with the identifier to recover the key in response to transmission of the wrapped key.

Example 3 includes the subject matter of any of Examples 1 and 2, and wherein: the service engine is further to: receive a request to establish secure communication with the management controller; and send a first locality proof challenge to the management controller, wherein the first locality proof challenge is signed with the key.

Example 4 includes the subject matter of any of Examples 1-3, and wherein the management controller comprises: a communication engine to generate a response to the first locality proof challenge, and a crypto engine to sign the response using the key.

Example 5 includes the subject matter of any of Examples 1-4, and wherein the service engine is further to: receive a response to the first locality proof challenge from the management controller, and to validate the response using the key.

Example 6 includes the subject matter of any of Examples 1-5, and wherein the service engine is further to: receive a second locality proof challenge from the management controller, generate a response to the second locality proof challenge, sign the response using the key, and send the signed response to the management controller.

Example 7 includes the subject matter of any of Examples 1-6, and wherein the service engine is further to establish the secure communication with the management controller in response to validation of the response.

Example 8 includes the subject matter of any of Examples 1-7, and wherein the service engine is further to return an error in response to a determination that the response to the first locality proof challenge is not valid.

Example 9 includes the subject matter of any of Examples 1-8, and wherein the management controller comprises a converged security and manageability engine.

Example 10 includes the subject matter of any of Examples 1-9, and wherein to transmit the identifier to the management controller via the hardware bus comprises to: transmit the identifier to the management controller via a sideband network.

Example 11 includes the subject matter of any of Examples 1-10, and wherein: the service engine is further to execute a first instruction by the processor in response to generation of the key, to encrypt the key comprises to encrypt the key using the identifier in response to execution of the first instruction by the processor, and to transmit the wrapped key comprises to transmit the wrapped key to the management controller via a sideband network.

Example 12 includes the subject matter of any of Examples 1-11, and wherein the first instruction comprises an EBIND instruction.

Example 13 includes the subject matter of any of Examples 1-12, and wherein to transmit the key comprises to: transmit the key in response to execution of a second instruction by the processor.

Example 14 includes the subject matter of any of Examples 1-13, and wherein the second instruction comprises an UNWRAP instruction.

Example 15 includes the subject matter of any of Examples 1-14, and wherein the communication engine is further to: send the identifier to one or more second processors of the computing device via the hardware bus.

Example 16 includes the subject matter of any of Examples 1-15, and wherein: the service engine is further to load a platform services enclave using secure enclave support of the processor, to generate the key comprises to generate the key by the platform services enclave, and to transmit the wrapped key to the management controller comprises to transmit the wrapped key to the management controller by the platform services enclave.

Example 17 includes the subject matter of any of Examples 1-16, and wherein to generate the identifier comprises to generate the identifier in response to a reset of the computing device.

Example 18 includes a method for establishing device locality, the method comprising: generating, by a processor in a computing device, an identifier distinct to the computing device; transmitting, by the processor, the identifier to a management controller via a hardware bus in the computing device; generating, by the processor, a key; encrypting, by the processor, the key with the identifier to generate a wrapped key in response to generation of the key; and transmitting, by the processor, the wrapped key to the management controller.

Example 19 includes the subject matter of Example 18, and further comprising: decrypting, by the management controller, the wrapped key with the identifier to recover the key in response to transmitting the wrapped key.

Example 20 includes the subject matter of any of Examples 18 and 19, and further comprising: receiving a request to establish secure communication with the management controller; sending, by the processor, in response to the request, a first locality proof challenge to the management controller, wherein the first locality proof challenge is signed with the key.

Example 21 includes the subject matter of any of Examples 18-20, and further comprising: generating, by the management controller, a response to the first locality proof challenge; and signing, by the management controller, the response using the key.

Example 22 includes the subject matter of any of Examples 18-21, and further comprising: receiving, by the processor, a response to the first locality proof challenge from the management controller; and validating, by the processor, the response using the key.

Example 23 includes the subject matter of any of Examples 18-22, and further comprising: receiving a second locality proof challenge from the management controller; generating a response to the second locality proof challenge; signing the response using the key; and sending the signed response to the management controller.

Example 24 includes the subject matter of any of Examples 18-23, and further comprising: establishing the secure communication with the management controller in response to validating the response.

Example 25 includes the subject matter of any of Examples 18-24, and further comprising: returning an error in response to determining that the response to the first locality proof challenge is not valid.

Example 26 includes the subject matter of any of Examples 18-25, and wherein the management controller is a converged security and manageability engine.

Example 27 includes the subject matter of any of Examples 18-26, and wherein transmitting the identifier to the management controller via the hardware bus comprises: transmitting the identifier to the management controller via a sideband network.

Example 28 includes the subject matter of any of Examples 18-27, and further comprising: executing a first instruction by the processor in response to generating the key, wherein encrypting the key comprises encrypting the key using the identifier in response to executing the first instruction by the processor, and transmitting the wrapped key comprises transmitting the wrapped key to the management controller via a sideband network.

Example 29 includes the subject matter of any of Examples 18-28, and wherein executing the first instruction comprises executing an EBIND instruction.

Example 30 includes the subject matter of any of Examples 18-29, and wherein transmitting the key comprises: transmitting the key in response to executing a second instruction by the processor.

Example 31 includes the subject matter of any of Examples 18-30, and wherein executing the second instruction comprises executing an UNWRAP instruction.

Example 32 includes the subject matter of any of Examples 18-31, and further comprising: sending, by the processor, the identifier to one or more second processors of the computing device via the hardware bus.

Example 33 includes the subject matter of any of Examples 18-32, and further comprising: loading, by the computing device, a platform services enclave using secure enclave support of the processor, wherein generating the key comprises generating the key by the platform services enclave, and wherein transmitting the wrapped key to the management controller comprises transmitting the wrapped key to the management controller by the platform services enclave.

Example 34 includes the subject matter of any of Examples 18-33, and wherein generating the identifier comprises generating the identifier in response to a reset of the computing device.

Example 35 includes a computing device comprising: a processor; and a memory having stored therein a plurality of instructions that when executed by the processor cause the computing device to perform the method of any of Examples 18-34.

Example 36 includes one or more non-transitory, computer readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for establishing device locality, the computing device comprising: means for generating, by a processor in the computing device, an identifier distinct to the computing device; means for transmitting, by the processor, the identifier to a management controller via a hardware bus in the computing device; means for generating, by the processor, a key; means for encrypting, by the processor, the key with the identifier to generate a wrapped key in response to generation of the key; and means for transmitting, by the processor, the wrapped key to the management controller.

Example 39 includes the subject matter of Example 38, and further comprising: means for decrypting, by the management controller, the wrapped key with the identifier to recover the key in response to transmitting the wrapped key.

Example 40 includes the subject matter of any of Examples 38 and 39, and further comprising: means for receiving a request to establish secure communication with the management controller; means for sending, by the processor, in response to the request, a first locality proof challenge to the management controller, wherein the first locality proof challenge is signed with the key.

Example 41 includes the subject matter of any of Examples 38-40, and further comprising: means for generating, by the management controller, a response to the first locality proof challenge; and means for signing, by the management controller, the response using the key.

Example 42 includes the subject matter of any of Examples 38-41, and further comprising: means for receiving, by the processor, a response to the first locality proof challenge from the management controller; and means for validating, by the processor, the response using the key.

Example 43 includes the subject matter of any of Examples 38-42, and further comprising: means for receiving a second locality proof challenge from the management controller; means for generating a response to the second locality proof challenge; means for signing the response using the key; and means for sending the signed response to the management controller.

Example 44 includes the subject matter of any of Examples 38-43, and further comprising: means for establishing the secure communication with the management controller in response to validating the response.

Example 45 includes the subject matter of any of Examples 38-44, and further comprising: means for returning an error in response to determining that the response to the first locality proof challenge is not valid.

Example 46 includes the subject matter of any of Examples 38-45, and wherein the management controller is a converged security and manageability engine.

Example 47 includes the subject matter of any of Examples 38-46, and wherein the means for transmitting the identifier to the management controller via the hardware bus comprises: means for transmitting the identifier to the management controller via a sideband network.

Example 48 includes the subject matter of any of Examples 38-47, and further comprising: means for executing a first instruction by the processor in response to generating the key, wherein the means for encrypting the key comprises means for encrypting the key using the identifier in response to executing the first instruction by the processor, and the means for transmitting the wrapped key comprises means for transmitting the wrapped key to the management controller via a sideband network.

Example 49 includes the subject matter of any of Examples 38-48, and wherein the means for executing the first instruction comprises means for executing an EBIND instruction.

Example 50 includes the subject matter of any of Examples 38-49, and wherein the means for transmitting the key comprises: means for transmitting the key in response to executing a second instruction by the processor.

Example 51 includes the subject matter of any of Examples 38-50, and wherein the means for executing the second instruction comprises means for executing an UNWRAP instruction.

Example 52 includes the subject matter of any of Examples 38-51, and further comprising: means for sending, by the processor, the identifier to one or more second processors of the computing device via the hardware bus.

Example 53 includes the subject matter of any of Examples 38-52, and further comprising: means for loading, by the computing device, a platform services enclave using secure enclave support of the processor, wherein the means for generating the key comprises means for generating the key by the platform services enclave, and wherein the means for transmitting the wrapped key to the management controller comprises means for transmitting the wrapped key to the management controller by the platform services enclave.

Example 54 includes the subject matter of any of Examples 38-53, and wherein the means for generating the identifier comprises means for generating the identifier in response to a reset of the computing device.

The invention claimed is:

1. A computing device for establishing secure communication using a device locality, the computing device comprising:
    a processor comprising:
        a generation engine to generate an identifier representing the device locality of the computing device and associate the identifier with each hardware component of a plurality of hardware components in the computing device such that each hardware component of the plurality of hardware components in the computing device shares the identifier, wherein the identifier is distinct to the computing device;
    the plurality of hardware components comprising:
        a management controller;
        a communication engine to transmit the identifier to the management controller via a hardware bus in the computing device;
        a service engine configured to:
            load a platform services enclave;
            generate a key using the platform services enclave;
            transmit a wrapped key to the management controller via a sideband network;
            receive a request to establish secure communication with the management controller;
            send a first locality proof challenge to the management controller signed with the key; and
        a crypto engine to encrypt the key with the identifier to generate the wrapped key in response to generation of the key;
    wherein the management controller comprises a second communication engine and a second crypto engine and the management controller is further configured to:
        decrypt, by the second crypto engine, the wrapped key received from the service engine to recover the key using the identifier;
        generate, by the second communication engine, a response to the first locality proof challenge and sign, by the second crypto engine, the response with the key; and
        send, by the second communication engine, the response to the first locality proof challenge to the service engine;
    wherein the service engine establishes secure communication with the management controller in response to validation of the response to the first locality proof challenge.

2. The computing device of claim 1, wherein the service engine is further to: receive a response to the first locality proof challenge from the management controller, and to validate the response to the first locality proof challenge using the key.

3. The computing device of claim 2, wherein the service engine is further to:
    receive a second locality proof challenge from the management controller,
    generate a response to the second locality proof challenge,
    sign the response to the second locality proof challenge using the key, and
    send the signed response to the management controller.

4. The computing device of claim 2, wherein the service engine is further to return an error in response to a determination that the response to the first locality proof challenge is not valid.

5. The computing device of claim 1, wherein:
    the service engine is further to execute a first instruction by the processor in response to generation of the key,
    to encrypt the key comprises to encrypt the key using the identifier in response to execution of the first instruction by the processor, and
    to transmit the wrapped key comprises to transmit the wrapped key to the management controller via the sideband network.

6. The computing device of claim 5, wherein to transmit the key comprises to:
    transmit the key in response to execution of a second instruction by the processor.

7. The computing device of claim 1, wherein to generate the identifier comprises to generate the identifier in response to a reset of the computing device.

8. A method for establishing secure communication using a device locality, the method comprising:
    generating, by a processor in a computing device, an identifier representing the device locality of the computing device and distinct to the computing device;
    associating the identifier with each hardware component of a plurality of hardware components in the computing device such that each hardware component of the plurality of hardware components in the computing device shares the identifier, the plurality of hardware components comprising a management controller, a communication engine, a service engine, and a crypto engine;
    transmitting, by the communication engine, the identifier to the management controller via a hardware bus in the computing device;
    loading, by the service engine, a platform services enclave;
    generating, by the service engine, a key using the platform services enclave;

encrypting, by the crypto engine, the key with the identifier to generate a wrapped key in response to generation of the key;

transmitting, by the service engine, the wrapped key to the management controller via a sideband network;

receiving, by the service engine, a request to establish secure communication with the management controller;

sending, by the service engine, a first locality proof challenge to the management control signed with the key;

decrypting, by a second crypto engine of the management controller, the wrapped key received from the service engine to recover the key using the identifier;

generating, by a second communication of the management controller, a response to the first locality proof challenge;

signing, by the second crypto engine, the response with the key;

sending, by the second communication engine, the response to the first locality proof challenge to the service engine; and establishing, by the service engine, secure communication with the management controller in response to validation of the response to the first locality proof challenge.

9. The method of claim 8, further comprising:

executing a first instruction by the processor in response to generating the key, wherein encrypting the key comprises encrypting the key using the identifier in response to executing the first instruction by the processor, and transmitting the wrapped key comprises transmitting the wrapped key to the management controller via the sideband network.

10. The method of claim 9, wherein transmitting the key comprises:

transmitting the key in response to executing a second instruction by the processor.

11. One or more non-transitory computer-readable storage media comprising a plurality of instructions stored thereon that, in response to being executed, cause a computing device to:

generate, by a processor in the computing device, an identifier distinct to the computing device, the identifier representing a device locality of the computing device;

associate the identifier with each hardware component of a plurality of hardware components in the computing device such that each hardware component of the plurality of hardware components in the computing device shares the identifier, the plurality of hardware components comprising a management controller, a communication engine, a service engine, and a crypto engine;

transmit, by the communication engine, the identifier to the management controller via a hardware bus in the computing device;

load, by the service engine, a platform services enclave;

generate, by the service engine, a key using the platform services enclave;

encrypt, by the crypto engine, the key with the identifier to generate a wrapped key in response to generation of the key;

transmit, by the service engine, the wrapped key to the management controller via a sideband network;

receive, by the service engine, a request to establish secure communication with the management controller;

send, by the service engine, a first locality proof challenge to the management controller signed with the key;

decrypt, by a second crypto engine of the management controller, the wrapped key received from the service engine to recover the key using the identifier;

generate, by a second communication of the management controller, a response to the first locality proof challenge;

sign, by the second crypto engine, the response with the key;

send, by the second communication engine, the response to the first locality proof challenge to the service engine; and establish, by the service engine, secure communication with the management controller in response to validation of the response to the first locality proof challenge.

12. The one or more non-transitory computer-readable storage media of claim 11, further comprising a plurality of instructions stored thereon that, in response to being executed, cause the computing device to:

execute a first instruction by the processor in response to generating the key, wherein to encrypt the key comprises to encrypt the key using the identifier in response to executing the first instruction by the processor, and to transmit the wrapped key comprises to transmit the wrapped key to the management controller via the sideband network.

13. The one or more non-transitory computer-readable storage media of claim 12, wherein to transmit the key comprises to:

transmit the key in response to executing a second instruction by the processor.

* * * * *